(12) United States Patent
Falconer

(10) Patent No.: US 6,794,895 B2
(45) Date of Patent: Sep. 21, 2004

(54) POWER SAVING TERMINATION TECHNIQUE FOR DIFFERENTIAL SIGNALING

(75) Inventor: Maynard C. Falconer, Portland, OR (US)

(73) Assignee: Intel Corporation, Santa Clara, CA (US)

(*) Notice: Subject to any disclaimer, the term of this patent is extended or adjusted under 35 U.S.C. 154(b) by 28 days.

(21) Appl. No.: 10/186,005

(22) Filed: Jun. 27, 2002

(65) Prior Publication Data

US 2004/0000925 A1 Jan. 1, 2004

(51) Int. Cl.[7] ............................................. H03K 19/003
(52) U.S. Cl. .......................... 326/30; 326/26; 333/24 R
(58) Field of Search .............................. 326/30, 21–22, 326/26; 333/24 R, 81 R, 4, 5

(56) References Cited

U.S. PATENT DOCUMENTS

| | | | |
|---|---|---|---|
| 4,486,739 A | | 12/1984 | Franaszek et al. |
| 6,380,787 B1 | * | 4/2002 | Forbes ........................ 327/292 |
| 6,448,813 B2 | * | 9/2002 | Garlepp et al. ................ 326/83 |
| 6,578,940 B2 | * | 6/2003 | Rehmann et al. .............. 347/5 |
| 6,600,339 B2 | * | 7/2003 | Forbes et al. ................. 326/86 |

* cited by examiner

*Primary Examiner*—James H. Cho
(74) *Attorney, Agent, or Firm*—Blakely, Sokoloff, Taylor & Zafman LLP

(57) ABSTRACT

A technique for reducing power consumption in voltage and current steered differential busses that transmit and receive encoded signals is described. A circuit is used to save power in the static state. The circuit blocks static current flow, but allows the frequency components associated with the signaling band.

15 Claims, 3 Drawing Sheets

100

POWER SAVING TERMINATION TECHNIQUE FOR DIFFERENTIAL SIGNALING

FIELD OF THE INVENTION

The present invention pertains to the field of integrated circuit design. More particularly, the present invention relates to a power saving termination technique for voltage and current steered differential busses.

BACKGROUND OF THE INVENTION

A computer system typically has components such as a processor, a main memory, a cache, and a chipset. Components of a computer system communicate with one another through interconnections or busses. There are multiple ways to implement a bus. The type of data to be transferred and timing requirements between computer components are common factors used to decide which bus implementation to use.

The use of differential busses has become more prevalent as the need for extremely high transfer rates between components in a computer system continue to grow. Differential busses typically involve the transfer of a pair of signals, known as a differential pair, such that when data on one transmission line is asserted high, the other transmission line has an active low signal. A receiver receives the signals and looks only at the difference between the two signals. Differential busses help to cancel out noise that is picked up on transmission lines because adjacent wires usually pick up approximately equal noise voltages. The more noise a bus is subjected to, the less timing margin the data is given to propagate across a transmission line. As a result, decreasing the noise on a bus helps a system to achieve improved transfer rates between components.

Several of the latest differential busses such as Infiniband, Third Generation Input/Output (3GIO), Serial Advanced Technology Attachment (SATA), and Universal Serial Bus (USB) use encoding techniques to eliminate direct current (DC) and low frequency components of a signal. Other busses achieve similar results using a modulation technique. By generating an approximately equal number of digital high and digital low signals to be transmitted across a bus, encoding and modulation helps to reduce signal distortion on the bus.

Moreover, encoded and modulated signals save power. For example, if an active high signal has to be driven for a great distance over a long period of time, the transmission line has to be charged for the entire time and distance. In the same example, by forcing intermittent low signals over the transmission line, encoded and modulated signals do not require the transmission line to be continuously charged.

Differential systems, however, are still susceptible to static state conditions such as when the system is placed in a standby mode. During static state, current flows if the voltages on the differential pair are different. As a result, power is dissipated. Thus, in order to conserve power in differential systems, it would be desirable to design a bus circuit that provides a bypass for static current flow while allowing transmitted encoded signals to reach their receiver circuitry.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
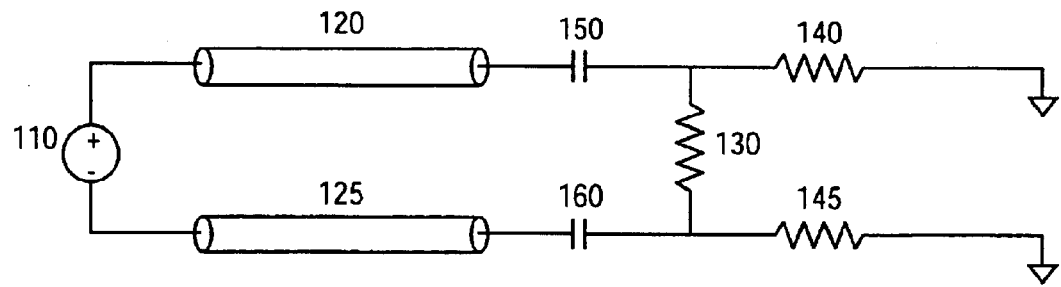
FIG. 1 shows an embodiment of the invention of a power saving Pi termination network driven by a voltage source.

Conductors or transmission lines that are not terminated result in reflected voltage and current waves. The magnitude of the reflection is determined by the impedance of the lines and by the amplitude of the data. To prevent reflections, transmission lines may be terminated. For one embodiment of the invention, FIG. 1 depicts an example of a Pi termination technique of a voltage steered differential system that saves power during static states. Transmission line 120 and transmission line 125 are a differential pair. The voltage source 110 generates encoded or modified signals that are to be transmitted across transmission lines 120 and 125. The generated signals on transmission lines 120 and 125 may be differential. In such a case, resistors 140 and 145 may be sized to approximately match the impedance of transmission lines 120 and 125 when transmission lines 120 and 125 are in even mode. Even mode is defined by the situation where the data on transmission lines 120 and 125 are identical and switch at approximately the same time. In contrast, resistor 130 may be sized to approximately match the impedance of transmission lines 120 and 125 when transmission lines 120 and 125 are in odd mode. Odd mode is defined by the situation where the data on transmission lines 120 and 125 are in opposite states. Thus, in odd mode, the data on transmission line 120 is active high when the data on transmission 125 is active low.

Capacitor 150 is coupled between transmission line 120 and resistors 130 and 140. Similarly, capacitor 160 is coupled between transmission line 125 and resistors 130 and 145. Capacitors 150 and 160 may be sized according to the impedance and length of transmission lines 120 and 125, the frequency of the data transmitted by voltage source 110, and the allowable noise of the circuit.

Impedance is defined by the formula $$Z = (L/C)^{1/2}, \tag{1}$$

whereby Z is the impedance, L is the inductance, and C is the capacitance of the transmission line. From the impedance formula above, the inductance may be represented as $$L=Z^2*C. \quad (2)$$

The delay per unit length, t, of the transmission line is defined by the formula $$t=1/(f*d)=(L*C)^{1/2}, \quad (3)$$

whereby f is the frequency of the data on the transmission line and d is the length of the transmission line. Substituting equation (2) into equation (3), it follows that $$t=(Z^2*C*C)^{1/2}=z*C. \quad (4)$$

It can be derived from equations (3) and (4) that $$C=t/Z=1/(Z*f*d). \quad (5)$$

As previously stated, capacitors 150 and 160 may be sized according to the impedance of the transmission lines and the frequency of the data being transmitted on the transmission line. Noise on the transmission line can be factored into the capacitor value of equation (5) by defining the frequency and distance specifications conservatively. The capacitors 150 and 160 act similar to resistors having, infinite impedance when the currents and voltages in the circuit 100 do not vary with time. Because the DC signals are filtered by the capacitors 150 and 160, no current flows through the circuit and no power is dissipated. The high frequency encoded or modulated signals, however, are not constrained by the capacitors 150 and 160.

Figure 2:
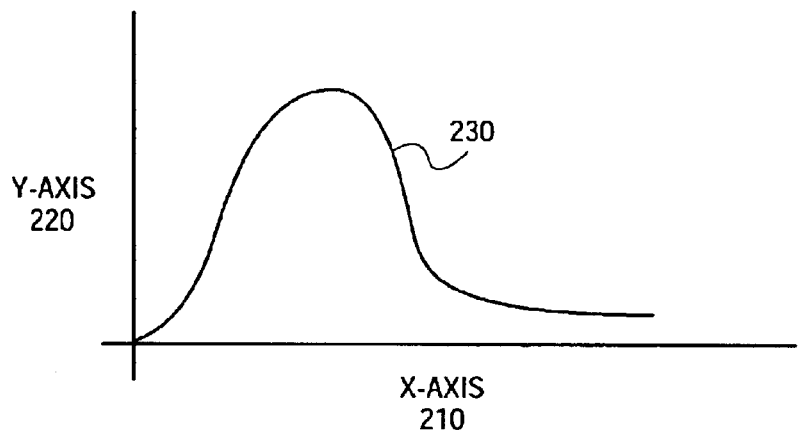
FIG. 2 shows a frequency versus magnitude plot of an encoded signal.

FIG. 2 depicts a frequency versus magnitude plot of an encoded signal 230. X-axis 210 is the frequency of the signal and y-axis 220 is the magnitude of the signal at a given frequency. Because the encoded signal 230 lacks low frequency content, capacitors 150 and 160 are able to filter out low frequency components transmitted on transmission lines 120 and 125 that are not a part of the encoded signal 230.

Figure 3:
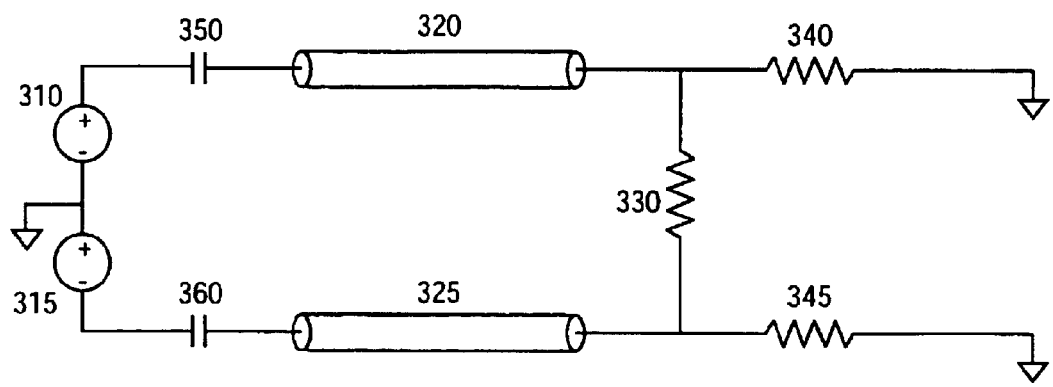
FIG. 3 shows another embodiment of the invention of a power saving Pi termination network driven by a voltage source.

FIG. 3 depicts another example of a modified Pi termination technique of a voltage steered differential system that saves power during static states. For this embodiment of the invention, voltage sources 310 and 315 of circuit 300 generate data to be transmitted across transmission lines 320 and 325. Capacitor 350 is coupled between voltage source 310 and transmission line 320, while capacitor 360 is coupled between voltage source 315 and transmission line 325. Transmission line 320 is also coupled to resistors 330 and 340. Transmission line 325 is coupled to resistors 330 and 345. Resistors 330, 340, and 345 serve to terminate the transmission lines 320 and 325. Termination helps to reduce reflection noise on transmission lines. To help stop static current flow, the capacitors 350 and 360 are sized according to the impedance and length of transmission lines 320 and 325, the frequency of the data transmitted by voltage sources 310 and 315, and the allowable noise of the network.

Figure 4:
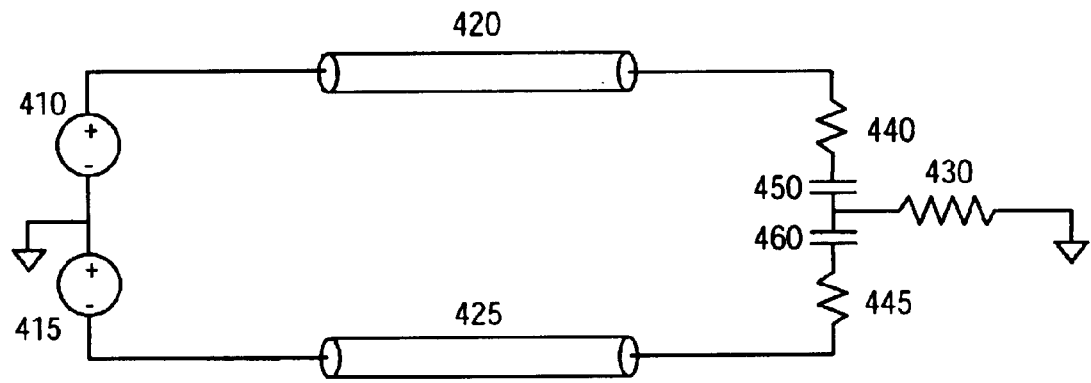
FIG. 4 shows an embodiment of the invention of a power saving T termination network driven by a voltage source.

For another embodiment of the invention, FIG. 4 depicts an example of a modified T termination technique of a voltage steered differential system that saves power during static states. Circuit 400 has a T termination structure. Voltage sources 410 and 415 generate differential signals to be transferred across transmission lines 420 and 425. The transmission line 420 is coupled to resistor 440 and the transmission line 425 is coupled to resistor 445. Capacitor 450 is coupled to resistor 440 and capacitor 450. Capacitor 460 is coupled to resistor 445 and capacitor 450. Resistor 430 is coupled to both capacitors 450 and 460. The capacitors 450 and 460 block static current flow in the circuit 400, preventing power dissipation when DC signals are transmitted across transmission lines 420 and 425.

Figure 5:
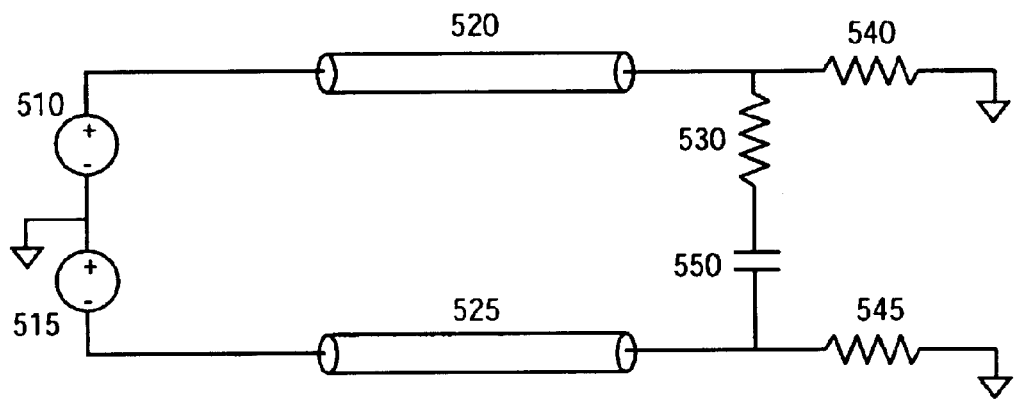
FIG. 5 shows yet another embodiment of the invention of a power saving Pi termination network driven by a voltage source.

FIG. 5 depicts another example of a modified T termination technique of a voltage steered differential system that saves power during static states. In this example, voltage sources 510 and 515 generate signals to be transmitted across transmission line 520 and transmission line 525. Resistors 530 and 540 are coupled to transmission line 520. Resistor 530 is also coupled to a node of capacitor 550. The other node of capacitor 550 is coupled to transmission line 525 and resistor 545. Capacitor 550 acts to block the static current flow across transmission lines 520 and 525.

Figure 6:
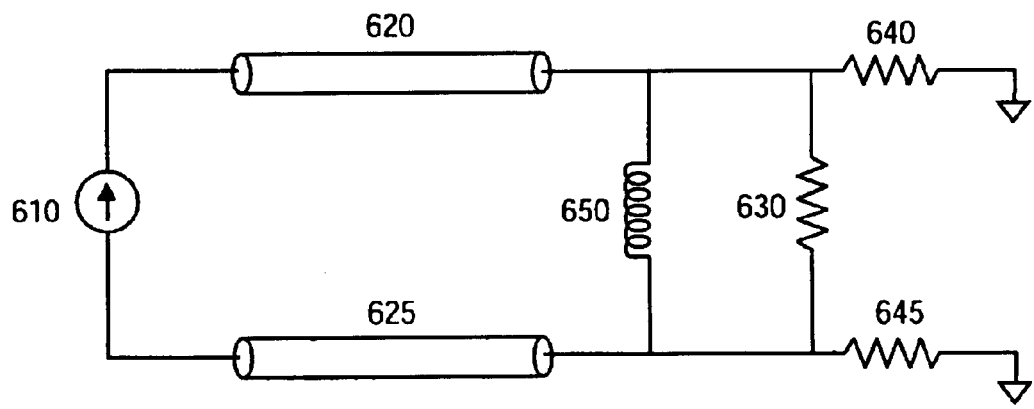
FIG. 6 shows an embodiment of the invention of a power saving Pi termination network driven by a current source.

For yet another embodiment of the invention, FIG. 6 depicts an example of a power saving Pi termination of a current steered differential system. Like voltage steered busses, current steered differential systems that use the Pi and T termination networks dissipates power when the bus is static, or in a standby state. When the system is in a static state, current flows through the termination network, which results in power loss. Current source 610 generates data to be distributed on transmission lines 620 and 625. Resistors 630, 640, and 645 are coupled to the transmission lines to terminate the transmission lines 620 and 625. To prevent static current flow, circuit 600 incorporates an inductor 650 to block static current flow. Inductors appear as a zero resistance connection (short circuit) in a DC circuit. Thus, inductor 650 provides a bypass for the static current flow, but is small enough in value to act as a high impedance path for the frequency components associated with the data.

The value of the inductor may be chosen according to the impedance of the transmission lines, the frequency of the data being transferred and the length of the transmission lines. From the impedance formula of equation (1), capacitance is defined as $$C=L/Z^2. \quad (6)$$

Substituting equation (6) into equation (3), $$t=1/f*d=L/Z. \quad (7)$$

From equation (7), $$L=Z/f*d. \quad (8)$$

Figure 7:
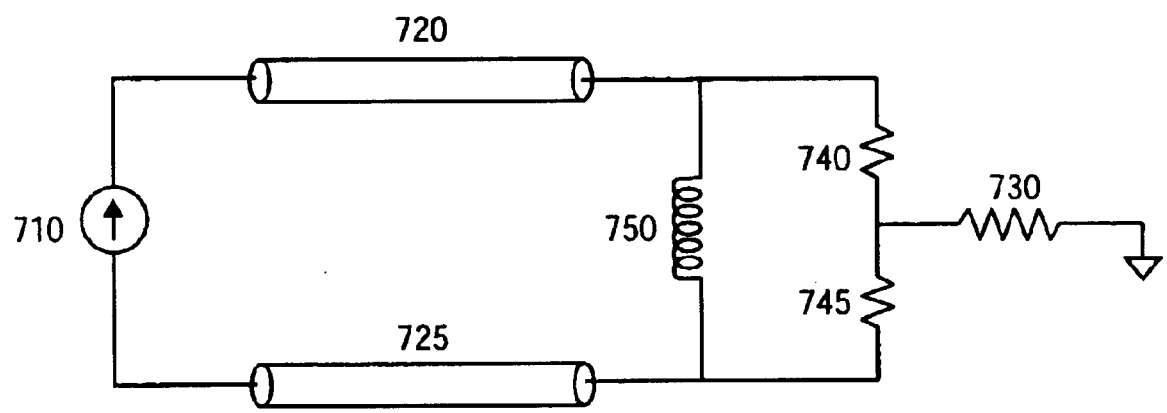
FIG. 7 shows an embodiment of the invention of a power saving T termination network driven by a current source.

For yet another embodiment of the invention, FIG. 7 depicts an example of a power saving T termination for a pair of current steered differential signals. Current source 710 generates signals to be distributed on transmission lines 720 and 725. The transmission lines 720 and 725 are terminated using a T termination network comprising resistors 740, 745, and 730. Inductor 750 is coupled to transmission lines 720 and 725 to provide a bypass for static current flow.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. An electrical circuit comprising:
   a first transmission line, wherein the first transmission line transmits a first high frequency signal having a frequency f;

a second transmission line, wherein the second transmission line transmits a second high frequency signal having a frequency f, wherein the first and second signals form a differential pair, wherein the first and the second transmission lines have an impedance Z and a length d;

a termination network to terminate the first transmission line and the second transmission line; and m capacitors, wherein m is an integer greater than or equal to one, wherein each of the m capacitors has a capacitance approximately equal to: 1/(Z*f*d).

2. The circuit of claim 1, wherein the termination network is a Pi termination network.

3. The circuit of claim 2, further comprising a voltage source, wherein the voltage source generates data to be distributed on the first transmission line and the second transmission line.

4. The circuit of claim 3, wherein the first of m capacitors is coupled to the voltage source and the first transmission line, wherein the second of m capacitors is coupled to the voltage source and the second transmission line.

5. The circuit of claim 2, wherein the first of m capacitors is coupled to the first transmission line, wherein the second of m capacitors is coupled to the second transmission line, wherein the Pi termination network is coupled to the first and second of m capacitors.

6. The circuit of claim 2, wherein the Pi termination network comprises:

a first resistor, wherein the first resistor has a first node and a second node;

a second resistor, wherein the second resistor has a first node and a second node, wherein the first node of the first resistor is coupled to the first node of the second resistor;

a capacitor having a first node and a second node, wherein the first node of the capacitor is coupled to the second node of the second resistor; and a third resistor having a first node and a second node, wherein the first node of the third resistor is coupled to the second node of the capacitor.

7. The circuit of claim 6, wherein the Pi termination network is coupled to the first transmission line and the second transmission line.

8. The circuit of claim 1, wherein the first frequency of the first high frequency signal is approximately equal to the second frequency of the second high frequency signal, wherein the first transmission line and the second transmission line have an approximately equal length, and impedance value.

9. The circuit of claim 8, wherein each of the m capacitors has a capacitance approximately equal to the inverse of the product of the impedance of the first transmission line, the frequency of the first high frequency signal, and the length of the first transmission line.

10. The circuit of claim 1, wherein the first and second high frequency signals are encoded.

11. The circuit of claim 10, wherein each of the first and second encoded signals have an approximately equal number of asserted high values and asserted low values.

12. The circuit of claim 10, wherein the first and second high frequency encoded signals lack a significant low frequency content.

13. The circuit of claim 1, wherein the first and second high frequency signals are modulated.

14. The circuit of claim 1, wherein the termination network is a T termination network.

15. The circuit of claim 14, wherein the T termination network comprises:

a first resistor having a first node and a second node, wherein the first nods of the first resistor is coupled to the first transmission line;

a first of m capacitors having a first node and a second node, wherein the first node of the first of m capacitors is coupled to the second node of the first resistor;

a second resistor having a first node and a second node, wherein the first node of the second resistor is coupled to the second node of the first of m capacitors, wherein the second node of the second resistor is coupled to a ground;

a second of m capacitors having a first node and a second node, wherein the first node of the second of m capacitors is coupled to the second node of the first of m capacitors and the first node of the second resistor; and a third resistor having a first node and a second node, wherein the first node of the third resistor is coupled to the second node of the second of m capacitors and the second node of the third resistor is coupled to the second transmission line.

* * * * *

UNITED STATES PATENT AND TRADEMARK OFFICE
CERTIFICATE OF CORRECTION

PATENT NO. : 6,794,895 B2
DATED : September 21, 2004
INVENTOR(S) : Falconer

It is certified that error appears in the above-identified patent and that said Letters Patent is hereby corrected as shown below:

Column 6,
Line 3, after "length", delete ",".
Line 25, delete "nods" and insert -- node --.

Signed and Sealed this

Twenty-second Day of February, 2005

JON W. DUDAS
*Director of the United States Patent and Trademark Office*